3,456,023
HALOGENATED ALPHA-METHYLSTYRENE
HALOFORM ADDUCTS
Omar O. Juveland, South Holland, Ill., assignor to Standard Oil Company, Chicago, Ill., a corporation of Indiana
No Drawing. Filed May 31, 1967, Ser. No. 642,351
Int. Cl. C07c 25/00
U.S. Cl. 260—650
1 Claim

ABSTRACT OF THE DISCLOSURE

A new class of chemical compounds are halogenated alpha-methyl styrene and ring-substituted alpha-methyl styrene haloform adducts.

---

I have discovered a new class of chemical compounds which can be represented by the general formula

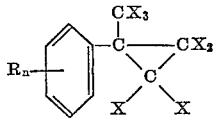

wherein X is chlorine or bromine, R is a lower alkyl group containing 1 to 3 carbon atoms substituted with chlorine, and $n$ is an integer from 0 through 5. The compounds of my invention can be made by reacting alpha-methyl styrene or ring-substituted alpha-methyl styrenes with a haloform using a base catalyst to yield a dihalo propyl intermediate which can then be halongenated by free radical catalysis to produce the new compounds.

The starting materials suitable for the practice of my invention are alpha-methyl styrene and the ring-substituted derivatives of alpha-methyl styrene, such as para-methyl alpha-methyl styrene, 3,4- and 3,5-dimethyl alpha-methyl styrenes, 2,3,4-trimethyl alpha-methyl styrene, 3,5-diethyl alpha-methyl styrene, 4-n-propyl alpha-methyl styrene, and the like, which correspond to the general formula

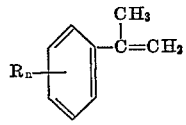

wherein R is a lower alkyl group containing 1 to 3 carbon atoms and $n$ is an integer from 0 through 5. The starting materials I prefer to employ in the practice of my invention as a matter of ready availability are those wherein R has a value of 0 through 2.

The preparation of a compound in accordance with my invention is set forth in an example hereinbelow so as to give those skilled in the art a better understanding of the invention. While the exemplification relates only to chloroform as the haloform, chlorine gas as the free radical halogenating agent, and alpha-methyl styrene as the starting material, the workers in the art will understand that other compounds can be prepared in similar fashion with other haloforms, halogenating agents and starting materials, making such changes in reaction conditions as are within the ability of the workers in this art. Haloform reactions and free radical halogenations are well known chemical reactions and to give specific conditions for carrying out these reactions is here unnecessary.

Example 1-phenyl-1-methyl-2,2-dichloro cyclopropane was prepared according to the following procedure: To 16 g. potassium metal there was added 200 cc. t-butyl alcohol for the preparation of potassium t-butoxide. The excess alcohol was removed at 90° C. in a vacuum oven at about 20–25 mm. mercury and the potassium t-butoxide was placed in a resin kettle which was maintained at −25° C. Into the kettle there was added 118 g. of alpha-methyl and 36 g. of freshly distilled chloroform, the latter being added dropwise over a period of 1.25 hours. The mixture was then held at −25° C. for an additional 5 hours, after which it was brought to room temperature. Next there was added 250 cc. water and 250 cc. n-pentane to dissolve all solids. The water and n-pentane layers were separated and the water layer was washed three times with 250 cc. portions of n-pentane. These n-pentanes washings were combined with the original n-pentane layer and dried overnight over sodium sulfate, following which the n-pentane was distilled. Fractionation of the residue yielded unreacted alpha-methyl styrene and 54 g. of 1-phenyl-1-methyl-2,2-dichloro cyclopropane, which represents a yield of 89.6 weight percent. The refractive index of this product was 1.5420 at 20° C. and upon analysis it was found to contain about 32.3 weight percent chlorine and for which the theoretical value is 35.2 weight percent chlorine.

A compound of the invention was made according to the following procedure.

Ten grams of 1-phenyl-1-methyl-2,2-dichloro cyclopropane was treated with flowing chlorine gas at room temperature for 7 hours. Following this treatment, the product was held in a vacuum oven for two days at 60° C. There was obtained about 18 g. of product, essentially a quantitative yield, which contained 64.0 weight percent chlorine and for which the theoretical value is 66.5 weight percent chlorine. This compound is 1-phenyl-1-trichloromethyl-2,2,3,3-tetrachloro cyclopropane.

Because of the composition of my new class of compounds, they are useful as insecticides, herbicides or bacteriostats. A demonstration of the utility of the compound prepared as described in the preceding example was carried out as described hereinbelow.

A stock solution of the compound was prepared having a concentration of 1000 parts per million. Such solutions can be made with compounds of my invention in water or, if not completely soluble in water, in a mixture of water containing greater or lesser amounts of an organic alcohol, such as ethyl alcohol. Compounds which are not soluble in such solutions can be dissolved in hydrocarbon solvents. Aliquots of the stock solution were used to prepare solutions of the novel compound having concentrations of 100 p.p.m. and 20 p.p.m. Seeded plates were prepared for test purposes having a small filter paper disk located on an Agar nutrient. Such plates were prepared with eleven bacilli spore stocks which had been obtained from a slaughter house and which were representative of typical contamination. A twelfth plate was prepared using a standard bacillus which was *Bacillus subtilis* American Type Culture Collection No. 6633. Onto each filter paper disk on each seeded plate there was placed 0.1 ml. of a solution of the compound for testing in a concentration of 100 p.p.m. A duplicate set of plates was treated with a solution having a concentration of 20 p.p.m. The plates were then placed under incubation for periods of 24 to 48 hrs. and visually inspected for zones of inhibition.

It was found that at both concentrations tested, the compound of my invention had an inhibition rating of 12/12 meaning that it was effective against all twelve bacilli spore stocks.

Other uses for the compounds of my invention, such as intermediates for the preparation of highly substituted organic molecules, will be apparent to those skilled in this art.

Having thus described my invention, what I claim is:

1. 1-phenyl-1-trichloro-methyl-2,2,3,3-tetrachloro cyclopropane.

References Cited

UNITED STATES PATENTS

| | | | |
|---|---|---|---|
| 1,246,739 | 11/1917 | Gibbs et al. | 260—651 XR |
| 2,132,361 | 10/1938 | Osswald et al. | 260—651 |
| 2,566,065 | 8/1951 | Loverde et al. | 204—163 |
| 2,606,867 | 8/1952 | Pianfetti et al. | 204—163 |
| 3,012,079 | 12/1961 | Bruson et al. | 260—650 XR |
| 3,044,999 | 7/1962 | Tousignant | 260—651 XR |
| 3,046,314 | 7/1962 | Fields et al. | 260—650 |
| 3,157,697 | 11/1964 | Sandri et al. | 260—650 XR |
| 3,264,359 | 8/1966 | Dickerson et al. | 260—650 XR |
| 3,265,743 | 8/1966 | Robinson | 260—650 XR |
| 3,338,978 | 8/1967 | Moore. | |
| 3,341,611 | 9/1967 | Popoff et al. | 260—650 |

FOREIGN PATENTS

| | | |
|---|---|---|
| 1,200,275 | 9/1965 | Germany. |

OTHER REFERENCES

Harvey et al.: J. Appl. Chem., June, 1954, pp. 319—325.

LEON ZITVER, Primary Examiner

H. T. MARS, Assistant Examiner

U.S. Cl. X.R.

424—353

PO-1050
(5/69)

UNITED STATES PATENT OFFICE
CERTIFICATE OF CORRECTION

Patent No. 3,456,023            Dated July 15, 1969

Inventor(s) Omar O. Juveland

It is certified that error appears in the above-identified patent and that said Letters Patent are hereby corrected as shown below:

Column 1, line 26, "or bromine" should be deleted.
Column 2, line 9, after "alpha-methyl" add -- styrene --.

SIGNED AND SEALED

MAR 10 1970

(SEAL)
Attest:

Edward M. Fletcher, Jr.
Attesting Officer

WILLIAM E. SCHUYLER, JR.
Commissioner of Patents